(12) United States Patent
Biberger

(10) Patent No.: US 8,470,112 B1
(45) Date of Patent: Jun. 25, 2013

(54) WORKFLOW FOR NOVEL COMPOSITE MATERIALS

(75) Inventor: Maximilian A. Biberger, Scottsdale, AZ (US)

(73) Assignee: SDCmaterials, Inc., Tempe, AZ (US)

( * ) Notice: Subject to any disclaimer, the term of this patent is extended or adjusted under 35 U.S.C. 154(b) by 157 days.

(21) Appl. No.: 12/968,248

(22) Filed: Dec. 14, 2010

Related U.S. Application Data

(60) Provisional application No. 61/284,329, filed on Dec. 15, 2009.

(51) Int. Cl.
  *B29C 44/06* (2006.01)
  *C04B 35/63* (2006.01)
  *C04B 35/64* (2006.01)
  *F41H 5/04* (2006.01)

(52) U.S. Cl.
  USPC .......... 156/78; 156/274.4; 264/434; 264/46.5

(58) Field of Classification Search
  USPC .................. 156/78, 79, 274.4; 264/46.4, 46.5, 264/434
  See application file for complete search history.

(56) References Cited

U.S. PATENT DOCUMENTS

| | | | |
|---|---|---|---|
| 2,284,554 A | 5/1942 | Beyerstedt |
| 2,419,042 A | 4/1947 | Todd |
| 2,519,531 A | 8/1950 | Worn |
| 2,562,753 A | 7/1951 | Trost |
| 2,689,780 A | 9/1954 | Rice |
| 3,001,402 A | 9/1961 | Koblin |
| 3,067,025 A | 12/1962 | Chisholm |
| 3,145,287 A | 8/1964 | Siebein et al. |
| 3,178,121 A | 4/1965 | Wallace, Jr. |
| 3,179,782 A | 4/1965 | Matvay |
| 3,313,908 A | 4/1967 | Unger et al. |

(Continued)

FOREIGN PATENT DOCUMENTS

| | | |
|---|---|---|
| JP | 56-146804 | 11/1981 |
| JP | 61-086815 A | 5/1986 |

(Continued)

OTHER PUBLICATIONS

Derwent English Abstract for publication No. SU 193241 A, Application No. 1973SU1943286 filed on Jul. 2, 1973, published on Mar. 1, 1976, entitled "Catalyst for Ammonia Synthesis Contains Oxides of Aluminium, Potassium, Calcium, Iron and Nickel Oxide for Increased Activity," 3 pgs.

(Continued)

*Primary Examiner* — Michael Tolin
(74) *Attorney, Agent, or Firm* — Morrison & Foerster LLP

(57) ABSTRACT

A method of making a composite material, the method comprising: providing a tile, wherein the tile comprises an inorganic material; and bonding the tile to a ductile backing material using heat-curable adhering material and catalyzed foamable exothermic material between the tile and the ductile backing material, wherein heat generated from the use of the catalyzed foamable exothermic material cures the heat-curable adhering material. In some embodiments, the exotherm from the foaming of the foamable exothermic material cures the heat-curable adhering material for a time sufficient to unite a solid foam body to the heat-curable adhering material of the tile and the ductile backing material. The method is particularly advantageous in bonding a tile composed of nano-particles to a ductile backing material, as it helps retain the nanoscale properties of the nano-particles in the tile.

4 Claims, 3 Drawing Sheets

U.S. PATENT DOCUMENTS

| | | |
|---|---|---|
| 3,401,465 A | 9/1968 | Larwill |
| 3,450,926 A | 6/1969 | Kiernan |
| 3,457,788 A | 7/1969 | Miyajima |
| 3,537,513 A | 11/1970 | Austin |
| 3,741,001 A | 6/1973 | Fletcher et al. |
| 3,752,172 A | 8/1973 | Cohen et al. |
| 3,774,442 A | 11/1973 | Gustavsson |
| 3,830,756 A | 8/1974 | Sanchez et al. |
| 3,871,448 A | 3/1975 | Vann et al. |
| 3,892,882 A | 7/1975 | Guest et al. |
| 3,914,573 A | 10/1975 | Muehlberger |
| 3,959,420 A | 5/1976 | Geddes et al. |
| 3,969,482 A | 7/1976 | Teller |
| 4,008,620 A | 2/1977 | Narato et al. |
| 4,018,388 A | 4/1977 | Andrews |
| 4,139,497 A | 2/1979 | Castor et al. |
| 4,157,316 A | 6/1979 | Thompson et al. |
| 4,171,288 A | 10/1979 | Keith et al. |
| 4,174,298 A | 11/1979 | Antos |
| 4,227,928 A | 10/1980 | Wang |
| 4,248,387 A | 2/1981 | Andrews |
| 4,253,917 A | 3/1981 | Wang |
| 4,284,609 A | 8/1981 | deVries |
| 4,369,167 A | 1/1983 | Weir |
| 4,388,274 A | 6/1983 | Rourke et al. |
| 4,431,750 A | 2/1984 | McGinnis et al. |
| 4,436,075 A | 3/1984 | Campbell et al. |
| 4,458,138 A | 7/1984 | Adrian et al. |
| 4,459,327 A | 7/1984 | Wang |
| 4,505,945 A | 3/1985 | Dubust et al. |
| 4,513,149 A | 4/1985 | Gray et al. |
| 4,731,517 A | 3/1988 | Cheney |
| 4,764,283 A | 8/1988 | Ashbrook et al. |
| 4,765,805 A | 8/1988 | Wahl et al. |
| 4,824,624 A | 4/1989 | Palicka et al. |
| 4,855,505 A | 8/1989 | Koll |
| 4,866,240 A | 9/1989 | Webber |
| 4,885,038 A | 12/1989 | Anderson et al. |
| 4,983,555 A | 1/1991 | Roy et al. |
| 4,987,033 A | 1/1991 | Abkowitz et al. |
| 5,015,863 A | 5/1991 | Takeshima et al. |
| 5,041,713 A | 8/1991 | Weidman |
| 5,043,548 A | 8/1991 | Whitney et al. |
| 5,070,064 A | 12/1991 | Hsu et al. |
| 5,073,193 A | 12/1991 | Chaklader et al. |
| 5,157,007 A | 10/1992 | Domesle et al. |
| 5,230,844 A * | 7/1993 | Macaire et al. ............. 264/46.7 |
| 5,338,716 A | 8/1994 | Triplett et al. |
| 5,369,241 A | 11/1994 | Taylor et al. |
| 5,371,049 A | 12/1994 | Moffett et al. |
| 5,372,629 A | 12/1994 | Anderson et al. |
| 5,392,797 A | 2/1995 | Welch |
| 5,439,865 A | 8/1995 | Abe et al. |
| 5,442,153 A | 8/1995 | Marantz et al. |
| 5,460,701 A | 10/1995 | Parker et al. |
| 5,464,458 A | 11/1995 | Yamamoto |
| 5,485,941 A | 1/1996 | Guyomard et al. |
| 5,534,149 A | 7/1996 | Birkenbeil et al. |
| 5,553,507 A | 9/1996 | Basch et al. |
| 5,562,966 A | 10/1996 | Clarke et al. |
| 5,582,807 A | 12/1996 | Liao et al. |
| 5,611,896 A | 3/1997 | Swanepoel et al. |
| 5,630,322 A | 5/1997 | Heilmann et al. |
| 5,652,304 A | 7/1997 | Calderon et al. |
| 5,726,414 A | 3/1998 | Kitahashi et al. |
| 5,749,938 A | 5/1998 | Coombs |
| 5,776,359 A | 7/1998 | Schultz et al. |
| 5,788,738 A | 8/1998 | Pirzada et al. |
| 5,811,187 A | 9/1998 | Anderson et al. |
| 5,837,959 A | 11/1998 | Muehlberger et al. |
| 5,851,507 A | 12/1998 | Pirzada et al. |
| 5,853,815 A | 12/1998 | Muehlberger |
| 5,905,000 A | 5/1999 | Yadav et al. |
| 5,935,293 A | 8/1999 | Detering et al. |
| 5,989,648 A | 11/1999 | Phillips |
| 5,993,967 A | 11/1999 | Brotzman, Jr. et al. |
| 5,993,988 A | 11/1999 | Ohara et al. |
| 6,012,647 A | 1/2000 | Ruta et al. |
| 6,033,781 A | 3/2000 | Brotzman, Jr. et al. |
| 6,045,765 A | 4/2000 | Nakatsuji et al. |
| 6,059,853 A | 5/2000 | Coombs |
| 6,102,106 A | 8/2000 | Manning et al. |
| 6,117,376 A | 9/2000 | Merkel |
| 6,213,049 B1 | 4/2001 | Yang |
| 6,214,195 B1 | 4/2001 | Yadav et al. |
| 6,228,904 B1 | 5/2001 | Yadav et al. |
| 6,254,940 B1 | 7/2001 | Pratsinis et al. |
| 6,261,484 B1 | 7/2001 | Phillips et al. |
| 6,267,864 B1 | 7/2001 | Yadav et al. |
| 6,322,756 B1 | 11/2001 | Arno et al. |
| 6,342,465 B1 | 1/2002 | Klein et al. |
| 6,344,271 B1 | 2/2002 | Yadav et al. |
| 6,379,419 B1 | 4/2002 | Celik et al. |
| 6,387,560 B1 | 5/2002 | Yadav et al. |
| 6,395,214 B1 | 5/2002 | Kear et al. |
| 6,398,843 B1 | 6/2002 | Tarrant |
| 6,409,851 B1 | 6/2002 | Sethuram et al. |
| 6,413,781 B1 | 7/2002 | Geis et al. |
| 6,416,818 B1 | 7/2002 | Aikens et al. |
| RE37,853 E | 9/2002 | Detering et al. |
| 6,444,009 B1 | 9/2002 | Liu et al. |
| 6,475,951 B1 | 11/2002 | Domesle et al. |
| 6,517,800 B1 | 2/2003 | Cheng et al. |
| 6,524,662 B2 | 2/2003 | Jang et al. |
| 6,531,704 B2 | 3/2003 | Yadav et al. |
| 6,548,445 B1 | 4/2003 | Buysch et al. |
| 6,554,609 B2 | 4/2003 | Yadav et al. |
| 6,562,304 B1 | 5/2003 | Mizrahi |
| 6,562,495 B2 | 5/2003 | Yadav et al. |
| 6,569,397 B1 | 5/2003 | Yadav et al. |
| 6,569,518 B2 | 5/2003 | Yadav et al. |
| 6,572,672 B2 | 6/2003 | Yadav et al. |
| 6,579,446 B1 | 6/2003 | Teran et al. |
| 6,596,187 B2 | 7/2003 | Coll et al. |
| 6,603,038 B1 | 8/2003 | Hagemeyer et al. |
| 6,607,821 B2 | 8/2003 | Yadav et al. |
| 6,610,355 B2 | 8/2003 | Yadav et al. |
| 6,623,559 B2 | 9/2003 | Huang |
| 6,635,357 B2 | 10/2003 | Moxson et al. |
| 6,641,775 B2 | 11/2003 | Vigliotti et al. |
| 6,652,822 B2 | 11/2003 | Phillips et al. |
| 6,652,967 B2 | 11/2003 | Yadav et al. |
| 6,669,823 B1 | 12/2003 | Sarkas et al. |
| 6,682,002 B2 | 1/2004 | Kyotani |
| 6,689,192 B1 | 2/2004 | Phillips et al. |
| 6,699,398 B1 | 3/2004 | Kim |
| 6,706,097 B2 | 3/2004 | Zornes |
| 6,706,660 B2 | 3/2004 | Park |
| 6,710,207 B2 | 3/2004 | Bogan, Jr. et al. |
| 6,713,176 B2 | 3/2004 | Yadav et al. |
| 6,716,525 B1 | 4/2004 | Yadav et al. |
| 6,746,791 B2 | 6/2004 | Yadav et al. |
| 6,772,584 B2 | 8/2004 | Chun et al. |
| 6,786,950 B2 | 9/2004 | Yadav et al. |
| 6,813,931 B2 | 11/2004 | Yadav et al. |
| 6,817,388 B2 | 11/2004 | Tsangaris et al. |
| 6,832,735 B2 | 12/2004 | Yadav et al. |
| 6,838,072 B1 | 1/2005 | Kong et al. |
| 6,841,509 B1 | 1/2005 | Hwang et al. |
| 6,855,410 B2 | 2/2005 | Buckley |
| 6,855,426 B2 | 2/2005 | Yadav |
| 6,855,749 B1 | 2/2005 | Yadav et al. |
| 6,886,545 B1 | 5/2005 | Holm |
| 6,896,958 B1 | 5/2005 | Cayton et al. |
| 6,902,699 B2 | 6/2005 | Fritzemeier et al. |
| 6,916,872 B2 | 7/2005 | Yadav et al. |
| 6,919,527 B2 | 7/2005 | Boulos et al. |
| 6,933,331 B2 | 8/2005 | Yadav et al. |
| 6,972,115 B1 | 12/2005 | Ballard |
| 6,986,877 B2 | 1/2006 | Takikawa et al. |
| 6,994,837 B2 | 2/2006 | Boulos et al. |
| 7,007,872 B2 | 3/2006 | Yadav et al. |
| 7,022,305 B2 | 4/2006 | Drumm et al. |
| 7,052,777 B2 | 5/2006 | Brotzman, Jr. et al. |
| 7,073,559 B2 | 7/2006 | O'Larey et al. |
| 7,081,267 B2 | 7/2006 | Yadav |
| 7,101,819 B2 | 9/2006 | Rosenflanz et al. |

| | | |
|---|---|---|
| 7,147,544 B2 | 12/2006 | Rosenflanz |
| 7,147,894 B2 | 12/2006 | Zhou et al. |
| 7,166,198 B2 | 1/2007 | Van Der Walt et al. |
| 7,166,663 B2 | 1/2007 | Cayton et al. |
| 7,172,649 B2 | 2/2007 | Conrad et al. |
| 7,172,790 B2 | 2/2007 | Koulik et al. |
| 7,178,747 B2 | 2/2007 | Yadav et al. |
| 7,208,126 B2 | 4/2007 | Musick et al. |
| 7,211,236 B2 | 5/2007 | Stark et al. |
| 7,217,407 B2 | 5/2007 | Zhang |
| 7,220,398 B2 | 5/2007 | Sutorik et al. |
| 7,265,076 B2 | 9/2007 | Taguchi et al. |
| 7,307,195 B2 | 12/2007 | Polverejan et al. |
| 7,323,655 B2 | 1/2008 | Kim |
| 7,384,447 B2 | 6/2008 | Kodas et al. |
| 7,417,008 B2 | 8/2008 | Richards et al. |
| 7,494,527 B2 | 2/2009 | Jurewicz et al. |
| 7,541,012 B2 | 6/2009 | Yeung et al. |
| 7,541,310 B2 | 6/2009 | Espinoza et al. |
| 7,572,315 B2 | 8/2009 | Boulos et al. |
| 7,611,686 B2 | 11/2009 | Alekseeva et al. |
| 7,615,097 B2 | 11/2009 | McKechnie et al. |
| 7,618,919 B2 | 11/2009 | Shimazu et al. |
| 7,622,693 B2 | 11/2009 | Foret |
| 7,632,775 B2 | 12/2009 | Zhou et al. |
| 7,678,419 B2 | 3/2010 | Kevwitch et al. |
| 7,709,411 B2 | 5/2010 | Zhou et al. |
| 7,803,210 B2 | 9/2010 | Sekine et al. |
| 7,851,405 B2 | 12/2010 | Wakamatsu et al. |
| 7,874,239 B2 | 1/2011 | Howland |
| 7,897,127 B2 | 3/2011 | Layman et al. |
| 7,905,942 B1 | 3/2011 | Layman |
| 8,051,724 B1 | 11/2011 | Layman et al. |
| 8,076,258 B1 | 12/2011 | Biberger |
| 8,080,494 B2 | 12/2011 | Yasuda et al. |
| 8,142,619 B2 | 3/2012 | Layman et al. |
| 2001/0042802 A1 | 11/2001 | Youds |
| 2002/0018815 A1 | 2/2002 | Sievers et al. |
| 2002/0068026 A1 | 6/2002 | Murrell et al. |
| 2002/0079620 A1 | 6/2002 | DuBuis et al. |
| 2002/0100751 A1 | 8/2002 | Carr |
| 2002/0102674 A1 | 8/2002 | Anderson |
| 2002/0131914 A1 | 9/2002 | Sung |
| 2002/0143417 A1 | 10/2002 | Ito et al. |
| 2002/0182735 A1 | 12/2002 | Kibby et al. |
| 2002/0183191 A1 | 12/2002 | Faber et al. |
| 2002/0192129 A1 | 12/2002 | Shamouilian et al. |
| 2003/0036786 A1 | 2/2003 | Duren et al. |
| 2003/0042232 A1 | 3/2003 | Shimazu |
| 2003/0066800 A1 | 4/2003 | Saim et al. |
| 2003/0108459 A1 | 6/2003 | Wu et al. |
| 2003/0110931 A1 | 6/2003 | Aghajanian et al. |
| 2003/0139288 A1 | 7/2003 | Cai et al. |
| 2003/0143153 A1 | 7/2003 | Boulos et al. |
| 2003/0172772 A1 | 9/2003 | Sethuram et al. |
| 2003/0223546 A1 | 12/2003 | McGregor et al. |
| 2004/0009118 A1 | 1/2004 | Phillips et al. |
| 2004/0023302 A1 | 2/2004 | Archibald et al. |
| 2004/0023453 A1 | 2/2004 | Xu et al. |
| 2004/0077494 A1 | 4/2004 | LaBarge et al. |
| 2004/0103751 A1 | 6/2004 | Joseph et al. |
| 2004/0119064 A1 | 6/2004 | Narayan et al. |
| 2004/0127586 A1 | 7/2004 | Jin et al. |
| 2004/0167009 A1 | 8/2004 | Kuntz et al. |
| 2004/0176246 A1 | 9/2004 | Shirk et al. |
| 2004/0208805 A1 | 10/2004 | Fincke et al. |
| 2004/0213998 A1 | 10/2004 | Hearley et al. |
| 2004/0238345 A1 | 12/2004 | Koulik et al. |
| 2004/0251017 A1 | 12/2004 | Pillion et al. |
| 2004/0251241 A1 | 12/2004 | Blutke et al. |
| 2005/0000321 A1 | 1/2005 | O'Larey et al. |
| 2005/0000950 A1 | 1/2005 | Schroder et al. |
| 2005/0066805 A1 | 3/2005 | Park et al. |
| 2005/0077034 A1 | 4/2005 | King |
| 2005/0097988 A1 | 5/2005 | Kodas et al. |
| 2005/0106865 A1 | 5/2005 | Chung et al. |
| 2005/0163673 A1 | 7/2005 | Johnson et al. |
| 2005/0199739 A1 | 9/2005 | Kuroda et al. |
| 2005/0220695 A1 | 10/2005 | Abatzoglou et al. |
| 2005/0227864 A1 | 10/2005 | Sutorik et al. |
| 2005/0233380 A1 | 10/2005 | Persiri et al. |
| 2005/0240069 A1 | 10/2005 | Polverejan et al. |
| 2005/0258766 A1 | 11/2005 | Kim |
| 2005/0275143 A1* | 12/2005 | Toth ............................ 264/646 |
| 2006/0051505 A1 | 3/2006 | Kortshagen et al. |
| 2006/0068989 A1 | 3/2006 | Ninomiya et al. |
| 2006/0094595 A1 | 5/2006 | Labarge |
| 2006/0096393 A1 | 5/2006 | Pesiri |
| 2006/0105910 A1 | 5/2006 | Zhou et al. |
| 2006/0108332 A1 | 5/2006 | Belashchenko |
| 2006/0153728 A1 | 7/2006 | Schoenung et al. |
| 2006/0153765 A1 | 7/2006 | Pham-Huu et al. |
| 2006/0159596 A1 | 7/2006 | De La Veaux et al. |
| 2006/0166809 A1 | 7/2006 | Malek et al. |
| 2006/0222780 A1 | 10/2006 | Gurevich et al. |
| 2006/0231525 A1 | 10/2006 | Asakawa et al. |
| 2007/0048206 A1 | 3/2007 | Hung et al. |
| 2007/0049484 A1* | 3/2007 | Kear et al. ..................... 501/103 |
| 2007/0063364 A1 | 3/2007 | Hsiao et al. |
| 2007/0084308 A1 | 4/2007 | Nakamura et al. |
| 2007/0084834 A1 | 4/2007 | Hanus et al. |
| 2007/0087934 A1 | 4/2007 | Martens et al. |
| 2007/0163385 A1 | 7/2007 | Takahashi et al. |
| 2007/0173403 A1 | 7/2007 | Koike et al. |
| 2007/0178673 A1 | 8/2007 | Gole et al. |
| 2007/0253874 A1 | 11/2007 | Foret |
| 2007/0292321 A1 | 12/2007 | Plischke et al. |
| 2008/0006954 A1 | 1/2008 | Yubuta et al. |
| 2008/0031806 A1 | 2/2008 | Gavenonis et al. |
| 2008/0038578 A1 | 2/2008 | Li |
| 2008/0064769 A1 | 3/2008 | Sato et al. |
| 2008/0105083 A1 | 5/2008 | Nakamura et al. |
| 2008/0116178 A1 | 5/2008 | Weidman |
| 2008/0125308 A1 | 5/2008 | Fujdala et al. |
| 2008/0138651 A1 | 6/2008 | Doi et al. |
| 2008/0175936 A1* | 7/2008 | Tokita et al. .................... 425/78 |
| 2008/0187714 A1 | 8/2008 | Wakamatsu et al. |
| 2008/0206562 A1 | 8/2008 | Stucky et al. |
| 2008/0207858 A1 | 8/2008 | Kowaleski et al. |
| 2008/0274344 A1 | 11/2008 | Vieth et al. |
| 2008/0277092 A1 | 11/2008 | Layman et al. |
| 2008/0277266 A1 | 11/2008 | Layman |
| 2008/0277267 A1 | 11/2008 | Biberger et al. |
| 2008/0277268 A1 | 11/2008 | Layman |
| 2008/0277269 A1 | 11/2008 | Layman et al. |
| 2008/0277270 A1 | 11/2008 | Biberger et al. |
| 2008/0277271 A1 | 11/2008 | Layman |
| 2008/0280049 A1 | 11/2008 | Kevwitch et al. |
| 2008/0280751 A1 | 11/2008 | Harutyunyan et al. |
| 2008/0280756 A1 | 11/2008 | Biberger |
| 2009/0010801 A1 | 1/2009 | Murphy et al. |
| 2009/0054230 A1 | 2/2009 | Veeraraghavan et al. |
| 2009/0088585 A1 | 4/2009 | Schammel et al. |
| 2009/0114568 A1 | 5/2009 | Trevino et al. |
| 2009/0162991 A1 | 6/2009 | Beneyton et al. |
| 2009/0168506 A1 | 7/2009 | Han et al. |
| 2009/0170242 A1 | 7/2009 | Lin et al. |
| 2009/0181474 A1 | 7/2009 | Nagai |
| 2009/0200180 A1 | 8/2009 | Capote et al. |
| 2009/0253037 A1 | 10/2009 | Park et al. |
| 2009/0274903 A1 | 11/2009 | Addiego |
| 2009/0286899 A1 | 11/2009 | Hofmann et al. |
| 2010/0089002 A1 | 4/2010 | Merkel |
| 2010/0275781 A1 | 11/2010 | Tsangaris |
| 2011/0006463 A1 | 1/2011 | Layman |
| 2011/0143041 A1 | 6/2011 | Layman et al. |
| 2011/0143915 A1 | 6/2011 | Yin et al. |
| 2011/0143916 A1 | 6/2011 | Leamon |
| 2011/0143926 A1 | 6/2011 | Yin et al. |
| 2011/0143930 A1 | 6/2011 | Yin et al. |
| 2011/0143933 A1 | 6/2011 | Yin et al. |
| 2011/0144382 A1 | 6/2011 | Yin et al. |
| 2011/0152550 A1 | 6/2011 | Grey et al. |
| 2011/0158871 A1 | 6/2011 | Arnold et al. |
| 2011/0174604 A1 | 7/2011 | Duesel et al. |
| 2011/0247336 A9 | 10/2011 | Farsad et al. |
| 2012/0045373 A1 | 2/2012 | Biberger |
| 2012/0171098 A1* | 7/2012 | Hung et al. .................... 423/289 |

FOREIGN PATENT DOCUMENTS

| | | |
|---|---|---|
| JP | 63-214342 A | 9/1988 |
| JP | 05-228361 A | 9/1993 |
| JP | 05-324094 A | 12/1993 |
| JP | H6-065772 | 9/1994 |
| JP | 7031873 A | 2/1995 |
| JP | 07-256116 | 10/1995 |
| JP | 11-502760 A | 3/1999 |
| JP | 2000-220978 A | 8/2000 |
| JP | 2004-233007 A | 8/2004 |
| JP | 2004-249206 A | 9/2004 |
| JP | 2004-290730 A | 10/2004 |
| JP | 2005-503250 A | 2/2005 |
| JP | 2005-122621 A | 5/2005 |
| JP | 2005-218937 A | 8/2005 |
| JP | 2005-342615 A | 12/2005 |
| JP | 2006-001779 A | 1/2006 |
| JP | 2006-508885 A | 3/2006 |
| JP | 2006-247446 A | 9/2006 |
| JP | 2006-260385 A | 9/2006 |
| SU | 493241 | 3/1976 |
| TW | 201023207 | 6/2010 |
| WO | WO-96/28577 A1 | 9/1996 |
| WO | WO 02/092503 A1 | 11/2002 |
| WO | WO 2004/052778 A2 | 6/2004 |
| WO | WO 2006/079213 A1 | 8/2006 |
| WO | WO-2008/130451 A2 | 10/2008 |
| WO | WO 2008/130451 A2 * | 10/2008 |
| WO | WO-2008/130451 A3 | 10/2008 |
| WO | WO-2011/081833 A1 | 7/2011 |

OTHER PUBLICATIONS

A. Gutsch et al., "Gas-Phase Production of Nanoparticles", Kona No. 20, 2002, pp. 24-37.

Dr. Heike Mühlenweg et al., "Gas-Phase Reactions—Open Up New Roads to Nanoproducts", Degussa ScienceNewsletter No. 08, 2004, pp. 12-16.

Coating Generation: Vaporization of Particles in Plasma Spraying and Splat Formation, M. Vardelle, A. Vardelle, K-I li P. Fauchais, Universite de Limoges, 123 Avenue A. Thomas 87000, Limoges, F., Pure & Chem, vol. 68, No. 5, pp. 1093-1099, 1996.

H. Konrad et al., "Nanostructured Cu—Bi Alloys Prepared by Co-Evaporation in a Continuous Gas Flow," NanoStructured Materials, vol. 7, No. 6, 1996, pp. 605-610.

Kenvin et al. "Supported Catalysts Prepared from Mononuclear Copper Complexes: Catalytic Properties", Journal of Catalysis, pp. 81-91,(1992).

J. Heberlein, "New Approaches in Thermal Plasma Technology", Pure Appl. Chem., vol. 74, No. 3, 2002, pp. 327-335.

M. Vardelle et al., "Experimental Investigation of Powder Vaporization in Thermal Plasma Jets," Plasma Chemistry and Plasma Processing, vol. 11, No. 2, Jun. 1991, pp. 185-201.

National Aeronautics and Space Administration, "Enthalpy", http://www.grc.nasa.gov/WWW/K-12/airplane/enthalpy.html, Nov. 23, 2009, 1 page.

P. Fauchais et al., "Plasma Spray: Study of the Coating Generation," Ceramics International, Elsevier, Amsterdam, NL, vol. 22, No. 4, Jan. 1996, pp. 295-303.

P. Fauchais et al., "Les Dépôts Par Plasma Thermique," Revue Generale De L'Electricitie, RGE. Paris, FR, No. 2, Jan. 1993, pp. 7-12.

P. Fauchais et al, "La Projection Par Plasma: Une Revue," Annales De Physique, vol. 14, No. 3, Jun. 1989, pp. 261-310.

T. Yoshida, "The Future of Thermal Plasma Processing for Coating", Pure & Appl. Chem., vol. 66, No. 6, 1994 pp. 1223-1230.

Han et al., Deformation Mechanisms and Ductility of Nanostructured Al Alloys, Mat. Res. Soc. Symp. Proc. vol. 821, Jan. 2004, Material Research Society, http://www.mrs.org/s_mrs/bin.asp?CID=2670&DOC=FILE.PDF., 6 pages.

Nagai, Yasutaka, et al., "Sintering Inhibition Mechanism of Platinum Supported on Ceria-based Oxide and Pt-oxide-support Interaction," Journal of Catalysis 242 (2006), pp. 103-109, Jul. 3, 2006, Elsevier.

Stiles, A. B. (Jan. 1, 1987). "Manufacture of Carbon-Supported Metal Catalysts," in *Catalyst Supports and Supported Catalysts*, Butterworth Publishers, MA, pp. 125-132.

Bateman, J. E. et al. (Dec. 17, 1998). "Alkylation of Porous Silicon by Direct Reaction with Alkenes and Alkynes," *Angew. Chem Int. Ed.* 37(19):2683-2685.

Carrot, G. et al. (Sep. 17, 2002). "Surface-Initiated Ring-Opening Polymerization: A Versatile Method for Nanoparticle Ordering," *Macromolecules* 35(22):8400-8404.

Chen, H.-S. et al. (Jul. 3, 2001). "On the Photoluminescence of Si Nanoparticles," *Mater. Phys. Mech.* 4:62-66.

Fojtik, A. et al. (Apr. 29, 1994). "Luminescent Colloidal Silicon Particles," *Chemical Physics Letters* 221:363-367.

Fojtik, A. (Jan. 13, 2006). "Surface Chemistry of Luminescent Colloidal Silicon Nanoparticles," *J. Phys. Chem. B.* 110(5):1994-1998.

Hua, F. et al. (Mar. 2006). "Organically Capped Silicon Nanoparticles With Blue Photoluminescence Prepared by Hydrosilylation Followed by Oxidation," *Langmuir* 22(9):4363-4370.

Jouet, R. J. et al. (Jan. 25, 2005). "Surface Passivation of Bare Aluminum Nanoparticles Using Perfluoroalkyl Carboxylic Acids," *Chem. Mater.*17(11):2987-2996.

Kim, N. Y. et al. (Mar. 5, 1997). "Thermal Derivatization of Porous Silicon with Alcohols," *J. Am. Chem. Soc.* 119(9):2297-2298.

Kwon, Y.-S. et al. (Apr. 30, 2003). "Passivation Process for Superfine Aluminum Powders Obtained by Electrical Explosion of Wires," *Applied Surface Science* 211:57-67.

Langner, A. et al. (Aug. 25, 2005). "Controlled Silicon Surface Functionalization by Alkene Hydrosilylation," *J. Am. Chem. Soc.* 127(37):12798-12799.

Li, D. et al. (Apr. 9, 2005). "Environmentally Responsive "Hairy" Nanoparticles: Mixed Homopolymer Brushes on Silica Nanoparticles Synthesized by Living Radical Polymerization Techniques," *J. Am. Chem. Soc.* 127(7):6248-6256.

Li, X. et al. (May 25, 2004). "Surface Functionalization of Silicon Nanoparticles Produced by Laser-Driven Pyrolysis of Silane Followed by HF-HNO$_3$ Etching," *Langmuir* 20(11):4720-4727.

Liao, Y.-C. et al. (Jun. 27, 2006). "Self-Assembly of Organic Monolayers on Aerosolized Silicon Nanoparticles," *J.Am. Chem. Soc.* 128(28):9061-9065.

Liu, S.-M. et al. (Jan. 13, 2006). "Enhanced Photoluminescence from Si Nano-Organosols by Functionalization With Alkenes and Their Size Evolution," *Chem. Mater.* 18(3):637-642.

Neiner, D. (Aug. 5, 2006). "Low-Temperature Solution Route to Macroscopic Amounts of Hydrogen Terminated Silicon Nanoparticles," *J. Am. Chem. Soc.* 128:11016-11017.

Netzer, L. et al. (1983). "A New Approach to Construction of Artificial Monolayer Assemblies," *J. Am. Chem. Soc.* 105(3):674-676.

"Platinum Group Metals: Annual Review 1996" (Oct. 1997). Engineering and Mining Journal, p. 63.

Sailor, M. J. (1997). "Surface Chemistry of Luminescent Silicon Nanocrystallites," *Adv. Mater.* 9(10):783-793.

Subramanian, S. et al. (1991). "Structure and Activity of Composite Oxide Supported Platinum-Iridium Catalysts," *Applied Catalysts* 74: 65-81.

Tao, Y.-T. (May 1993). "Structural Comparison of Self-Assembled Monolayers of n-Alkanoic Acids on the surfaces of Silver, Copper, and Aluminum," *J. Am. Chem. Soc.* 115(10):4350-4358.

Zou, J. et al. (Jun. 4, 2004). "Solution Synthesis of Ultrastable Luminescent Siloxane-Coated Silicon Nanoparticles," *Nano Letters* 4(7):1181-1186.

U.S. Appl. No. 13/291,983, filed Nov. 8, 2011, for Layman et al.
U.S. Appl. No. 12/152,084, filed May 9, 2008, for Biberger.
U.S. Appl. No. 13/028,693, filed Feb. 16, 2011, for Biberger.
U.S. Appl. No. 12/943,909, filed Nov. 10, 2010, for Layman.
U.S. Appl. No. 12/152,111, filed May 9, 2008, for Biberger et al.
U.S. Appl. No. 12/151,830, filed May 8, 2008, for Biberger et al.
U.S. Appl. No. 12/968,245, filed Dec. 14, 2010, for Biberger.
U.S. Appl. No. 12/968,241, filed Dec. 14, 2010, for Biberger.
U.S. Appl. No. 12/968,239, filed Dec. 14, 2010, for Biberger.
U.S. Appl. No. 12/969,128, filed Dec. 15, 2010, for Biberger.
U.S. Appl. No. 12/962,463, filed Dec. 7, 2010, for Leamon.
U.S. Appl. No. 12/961,030, filed Dec. 6, 2010, for Lehman.
U.S. Appl. No. 12/961,108, filed Dec. 6, 2010, for Lehman.
U.S. Appl. No. 12/961,200, filed Dec. 6, 2010, for Lehman.
U.S. Appl. No. 12/968,253, filed Dec. 14, 2010, for Biberger.

U.S. Appl. No. 12/968,235, filed Dec. 14, 2010, for Biberger.
U.S. Appl. No. 12/969,306, filed Dec. 15, 2010, for Lehman et al.
U.S. Appl. No. 12/969,447, filed Dec. 15, 2010, for Biberger et al.
U.S. Appl. No. 12/969,087, filed Dec. 15, 2010, for Biberger.
U.S. Appl. No. 12/962,533, filed Dec. 7, 2010, for Yin et al.
U.S. Appl. No. 12/962,523, filed Dec. 7, 2010, for Yin et al.
U.S. Appl. No. 12/001,643, filed Dec. 11, 2007, for Biberger et al.
U.S. Appl. No. 12/474,081, filed May 28, 2009, for Biberger et al.
U.S. Appl. No. 12/001,602, filed Dec. 11, 2007, for Biberger et al.
U.S. Appl. No. 12/001,644, filed Dec. 11, 2007, for Biberger et al.
U.S. Appl. No. 12/969,457, filed Nov. 15, 2010, for Leamon et al.
U.S. Appl. No. 12/969,503, filed Nov. 15, 2010, for Leamon et al.
U.S. Appl. No. 12/954,813, filed Nov. 26, 2010, for Biberger.
U.S. Appl. No. 12/954,822, filed Nov. 26, 2010, for Biberger.
U.S. Appl. No. 13/033,514, filed Feb. 23, 2011, for Biberger et al.
Non-Final Office Action mailed Nov. 8, 2012, for U.S. Appl. No. 12/968,245, filed Dec. 14, 2010, for Biberger et al.; 13 pages.
Non-Final Office Action mailed on Sep. 26, 2012, for U.S. Appl. No. 12/968,241, filed Dec. 14, 2010, for Biberger et al.; 15 pages.
Non-Final Office Action mailed Nov. 8, 2012, for U.S. Appl. No. 12/968,253, filed Dec. 14, 2010, for Biberger et al., 13 pages.

* cited by examiner

WORKFLOW FOR NOVEL COMPOSITE MATERIALS

CROSS-REFERENCE TO RELATED APPLICATIONS

This application claims priority to U.S. Provisional Patent Application Ser. No. 61/284,329, filed Dec. 15, 2009 and entitled "MATERIALS PROCESSING," which is hereby incorporated herein by reference in its entirety as if set forth herein.

FIELD OF THE INVENTION

The present invention relates to the field of composite materials. More specifically, the present invention relates to the formation of composite materials from low-temperature bonding of inorganic material to organic material.

BACKGROUND OF THE INVENTION

While composite materials have a variety of different applications, all of which are within the scope of the present invention, they may be particularly useful in the production of body armor, such as bullet-proof vests.

Currently, body armor is formed by bonding two types of armor together. A meltable plate is bonded to a hard plate via melting in an autoclave. However, the resulting armor is limited in both its hardness and its ductility.

What is needed in the art is a way to improve the hardness and the ductility of body armor. In a broader sense, what is needed is a new way of combining inorganic tiles with organic fibers to form a composite material.

SUMMARY OF THE INVENTION

While the present invention is particularly useful in forming body armor, it is contemplated that it may have a variety of other applications as well, all of which are within the scope of the present invention.

In one aspect of the present invention, a method of making a composite material is provided. The method comprises providing a tile, wherein the tile comprises an inorganic material, and bonding the tile to a ductile backing material using heat-curable adhering material and catalyzed foamable exothermic material between the tile and the ductile backing material. Heat generated from the use of the catalyzed foamable exothermic material cures the heat-curable adhering material.

In some embodiments, the step of bonding comprises wetting an interior surface of the tile with the heat-curable adhering material, wetting an interior surface of the ductile backing material with the heat-curable adhering material, and forming an interior volume between the tile and the ductile backing material, wherein the interior surface of the tile and the interior surface of the ductile backing material are facing one another, and wherein the interior surface of the tile and the interior surface of the ductile backing material each form a boundary of the interior volume. The catalyzed foamable exothermic material is inserted into the interior volume after wetting the interior surfaces of the tile and the ductile backing material with the heat-curable adhering material. An amount of catalyzed foamable exothermic material is used that is sufficient to fill the entire interior volume when foamed and form a solid foam body between the tile and the ductile backing material. The exotherm from the foaming is allowed to activate and cure the heat-curable adhering material for a time sufficient to unite the solid foam body to the heat-curable adhering material of the tile and the ductile backing material.

In some embodiments, the step of forming the interior volume comprises sealing the interior volume to a degree sufficient to allow the catalyzed foamable exothermic material to expand and build up interior pressure within the interior volume, thereby creating physical pressurized contact between the catalyzed foamable exothermic material and the heat-curable adhering material of each of the tile and the ductile backing material.

In some embodiments, the adhering material is resin. In some embodiments, the heat generated during the bonding step does not exceed ¼ of the melting point temperature of the tile.

In some embodiments, the tile comprises sintered nano-powder. In some embodiments, the tile comprises spark plasma sintered nano-powder. In some embodiments, the sintered nano-powder comprises ceramic nano-powder. In some embodiments, the ceramic nano-powder comprises boron carbide. In some embodiments, the sintered nano-powder comprises ceramic nano-powder and metallic nano-powder.

In some embodiments, the tile comprises sintered powder. The powder comprises particles having a ceramic core with a metallic outer layer. In some embodiments, the metallic outer layer comprises at least one of copper, tantalum, titanium, molybdenum, and aluminum.

In some embodiments, the ductile backing material comprises a plurality of fibers. In some embodiments, the ductile backing material comprises a plurality of polyethylene fibers.

In another aspect of the present invention, a method of making a composite material is provided. The method comprises providing a plurality of nano-particles, forming a tile from the plurality of nano-particles by performing a spark plasma sintering process on the plurality of nano-particles, and bonding the tile to a ductile backing material using heat-curable adhering material and catalyzed foamable exothermic material between the tile and the ductile backing material, wherein heat generated from the use of the catalyzed foamable exothermic material cures the heat-curable adhering material.

In some embodiments, the step of providing the plurality of nano-particles comprises applying a plasma stream to a precursor powder, thereby vaporizing the precursor powder and condensing the vaporized powder, thereby forming the plurality of nano-particles.

In some embodiments, the plurality of nano-particles comprises ceramic material. In some embodiments, the ceramic material is boron carbide.

In some embodiments, the plurality of nano-particles comprises ceramic material and metallic material. In some embodiments, the metallic material comprises at least one of copper, tantalum, titanium, molybdenum, and aluminum.

In some embodiments, the step of bonding comprises wetting an interior surface of the tile with the heat-curable adhering material, wetting an interior surface of the ductile backing material with the heat-curable adhering material, and forming an interior volume between the tile and the ductile backing material, wherein the interior surface of the tile and the interior surface of the ductile backing material are facing one another, and wherein the interior surface of the tile and the interior surface of the ductile backing material each form a boundary of the interior volume. The catalyzed foamable exothermic material is inserted into the interior volume after wetting the interior surfaces of the tile and the ductile backing material with the heat-curable adhering material, wherein an amount of catalyzed foamable exothermic material is used that is sufficient to fill the entire interior volume when foamed and form a solid foam body between the tile and the ductile backing material. The exotherm from the foaming is allowed to activate and cure the heat-curable adhering material for a time sufficient to unite the solid foam body to the heat-curable adhering material of the tile and the ductile backing material.

In some embodiments, the step of forming the interior volume comprises sealing the interior volume to a degree sufficient to allow the catalyzed foamable exothermic material to expand and build up interior pressure within the interior volume, thereby creating physical pressurized contact between the catalyzed foamable exothermic material and the heat-curable adhering material of each of the tile and the ductile backing material.

In some embodiments, the adhering material is resin. In some embodiments, the heat generated during the bonding step does not exceed ¼ of the melting point temperature of the nano-particles that form the tile.

In some embodiments, the ductile backing material comprises a plurality of fibers. In some embodiments, the ductile backing material comprises a plurality of polyethylene fibers.

In yet another aspect of the present invention, a composite material is provided. The composite material comprises a tile comprising inorganic material and a ductile backing material. The tile and the ductile backing material are bonded together via foam material and cured adhering material.

In some embodiments, tile has an interior surface with cured adhering material disposed thereon, the ductile backing material has an interior surface with cured adhering material disposed thereon, and the foam material is disposed in between and in contact with the cured adhering material on the interior surface of the tile and the cured adhering material on the interior surface of the ductile backing material.

In some embodiments, the tile comprises sintered nano-particles that have retained their nanoscale properties. In some embodiments, the plurality of nano particles comprises ceramic material. In some embodiments, the ceramic material is boron carbide. In some embodiments, the plurality of nano-particles comprises ceramic material and metallic material. In some embodiments, the metallic material comprises at least one of copper, tantalum, titanium, molybdenum, and aluminum.

In some embodiments, the adhering material is resin. In some embodiments, the ductile backing material comprises a plurality of fibers. In some embodiments, the ductile backing material comprises a plurality of polyethylene fibers.

DETAILED DESCRIPTION OF THE INVENTION

The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the present invention is not intended to be limited to the embodiment shown but is to be accorded the widest scope consistent with the principles and features described herein.

This disclosure refers to both particles and powders. These two terms are equivalent, except for the caveat that a singular "powder" refers to a collection of particles. The present invention may apply to a wide variety of powders and particles. Powders that fall within the scope of the present invention may include, but are not limited to, any of the following: (a) nano-structured powders (nano-powders), having an average grain size less than 250 nanometers and an aspect ratio between one and one million; (b) submicron powders, having an average grain size less than 1 micron and an aspect ratio between one and one million; (c) ultra-fine powders, having an average grain size less than 100 microns and an aspect ratio between one and one million; and (d) fine powders, having an average grain size less than 500 microns and an aspect ratio between one and one million.

Figure 1:
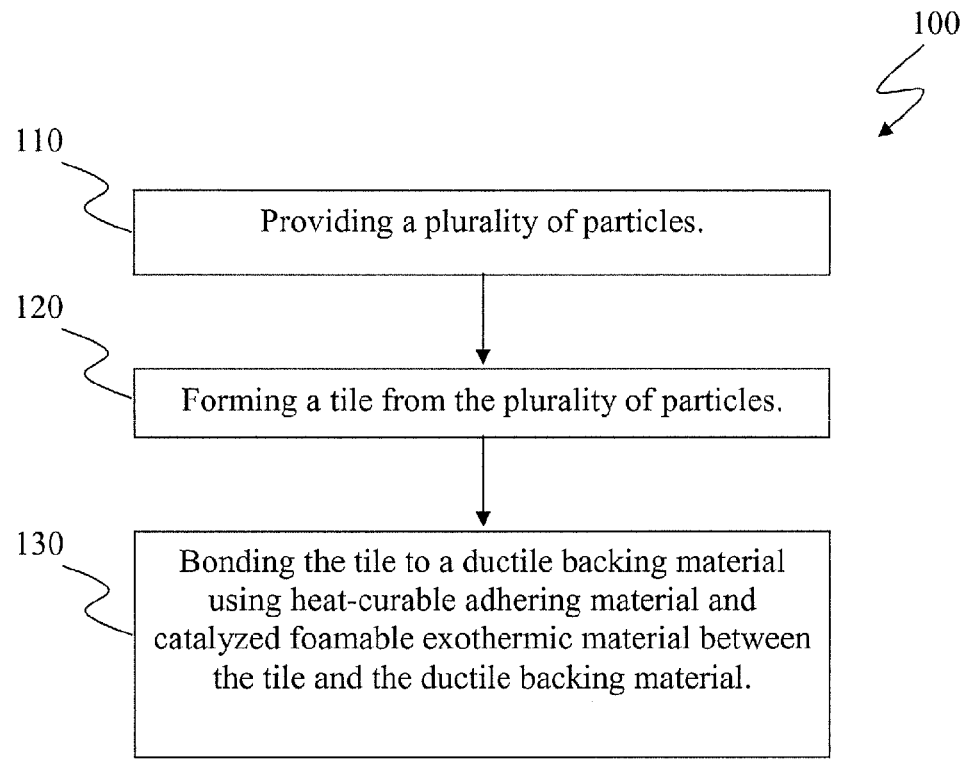
FIG. 1 is a flowchart illustrating one embodiment of a method of making a composite material in accordance with the principles of the present invention.

FIG. 1 is a flowchart illustrating one embodiment of a method 100 of making a composite material in accordance with the principles of the present invention. As mentioned above, in some embodiments, the method of the present invention is used in forming body armor. However, it is contemplated that it has a variety of other applications as well, all of which are within the scope of the present invention.

At step 110, a plurality of particles are provided. In a preferred embodiment, the particles include ceramic particles. For example, the plurality of particles can include boron carbide particles. The plurality of particles can also include metallic particles in addition or as an alternative to the ceramic particles. Such metallic particles include, but are not limited to, copper, tantalum, titanium, molybdenum, and aluminum. It is contemplated that other types of particles can be used as well. In some embodiments, each particle in the plurality of particles comprises a ceramic core surrounded by a metallic outer layer. The ceramic core maintains the toughness of the resulting tile, while the metallic outer layer makes the tile more ductile, thereby reducing the likelihood of fracture. In some embodiments, these particles having the ceramic core and the metallic outer layer are micron-sized.

In a preferred embodiment, the particles are provided as nano-particles. However, it is contemplated that other particle sizes can be employed. It is contemplated that the nano-scale structure of the particles can be achieved in a variety of ways. In a preferred embodiment, a plurality of precursor particles are vaporized in the hottest region of a plasma gun. The vaporized particles are then subjected to rapid quenching, causing them to condense. As a result of this vaporization and condensation, nano-sized particles are formed.

Examples of particle production systems employing plasma reactors to produce nano-sized particles are disclosed in U.S. patent application Ser. No. 12/151,935, filed on May 8, 2008 and entitled, "HIGHLY TURBULENT QUENCH CHAMBER", the entirety of which is hereby incorporated by reference as if set forth herein. One such particle production system 300 is presented in FIG. 3. The system 300 comprises a precursor supply device 310 and a working gas supply device 320 both fluidly coupled to a plasma production chamber 330 having an energy delivery zone 335 formed therein. The plasma production chamber 330 is fluidly coupled with an injection port 340 of a constricting quench chamber 345, thereby allowing the energy delivery zone 335 to fluidly communicate with the quench chamber 345. One or more ports 390 also allow fluid communication of the quench chamber 345 with a controlled atmosphere system 370 (indicated by the dotted lines). The quench chamber 345 is also fluidly coupled with an ejection port 365.

Generally, the plasma production chamber 330 operates as a reactor, producing an output comprising particles within a gas stream. Particle production includes the steps of combination, reaction, and conditioning. Working gas is supplied from a gas source to a plasma reactor. Within the plasma reactor, energy is delivered to the working gas, thereby creating a plasma. A variety of different means can be employed to deliver this energy, including, but not limited to, DC coupling, capacitive coupling, inductive coupling, and resonant coupling. One or more material dispensing devices introduce at least one material, preferably in powder form, into the plasma reactor. The combination within the plasma reactor of the plasma and the material(s) introduced by the material dispensing device(s) forms a highly reactive and energetic mixture, wherein the powder can be vaporized. This mixture of vaporized powder moves through the plasma reactor in the flow direction of the working gas. As it moves, the mixture cools and particles are formed therein. The still-energetic output mixture, comprising hot gas and energetic particles, is emitted from the plasma reactor.

In an exemplary embodiment, the plasma production chamber 330 combines precursor material (preferably in powder form) supplied from the precursor supply device 310 and working gas supplied from the working gas supply device 320 within the energy delivery zone 335, where the working gas is energized to form a plasma. The plasma is applied to the precursor material within the energy delivery zone 335 to form an energized, reactive mixture. This mixture comprises one or more materials in at least one of a plurality of phases, which may include vapor, gas, and plasma.

The reactive mixture flows from the energy delivery zone 335 into the constricting quench chamber 345 through the injection port 340. As the hot mixture moves from the energy delivery zone 335, it expands rapidly within the quench chamber 345 and cools. While the mixture flows into the quench chamber 345, the ports 390 supply conditioning fluid along the inner surfaces of the quench chamber 345. The conditioning fluid combines, at least to some extent, with the mixture, and flows from the quench chamber 345 through the ejection port 365.

During a period immediately after entering the quench chamber 345, particle formation occurs. Furthermore, the supply of conditioning fluid along the inner surfaces of the quench chamber 345 works to condition the reactive mixture, to maintain entrainment of the particles therein, and to prevent the depositing of material on the inner surfaces of the quench chamber 345.

Figure 3:
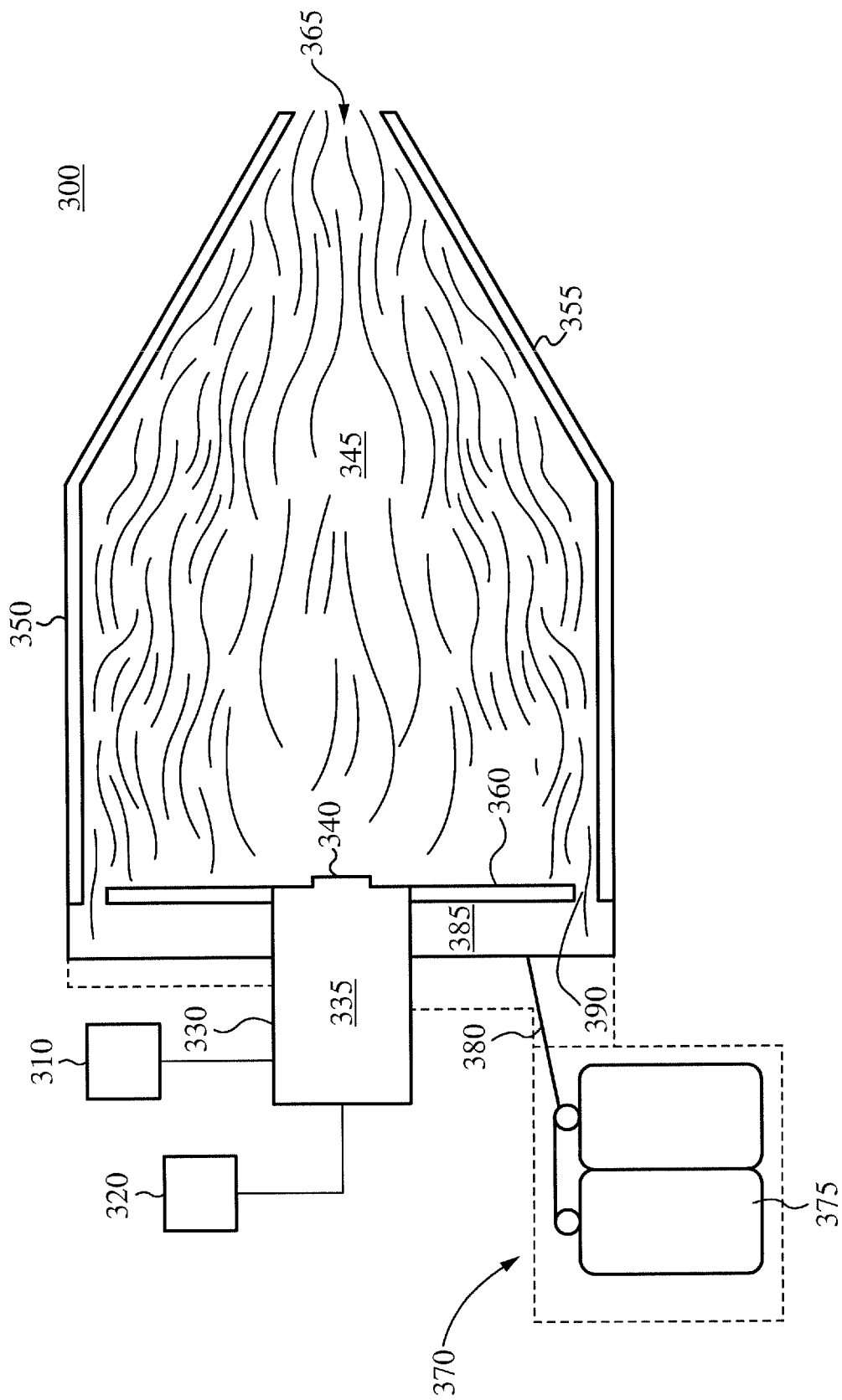
FIG. 3 illustrates one embodiment of a particle production system in accordance with the principles of the present invention.

Still referring to FIG. 3, the structure of the quench chamber 345 can be formed of relatively thin walled components capable of dissipating substantial heat. For example, the thin-walled components can conduct heat from inside the chamber and radiate the heat to the ambient. The quench chamber 345 comprises a substantially cylindrical surface 350, a cone-like (frusto-conical) surface 355, and an annular surface 360 connecting the injection port 340 with the cylindrical surface 350. The cylindrical surface 350, having a large diameter relative to the size of the injection port 340, provides accommodation for the expansion of the reactive mixture that occurs after the mixture flows into the quench chamber 345. The cone-like surface 355 extends from the cylindrical surface 350, away from the injection port 340 and towards the ejection port 365. The cone-like surface 355 is sufficiently smoothly varying so as to not unduly compress fluid flowing from through the quench chamber 345 to the ejection port 365.

Substantial heat is emitted, mostly in the form of radiation, from the mixture following its entry into the quench chamber 345. The quench chamber 345 is preferably designed to dissipate this heat efficiently. For example, the surfaces of the quench chamber 345 are preferably exposed to a cooling apparatus (not shown).

Still referring to FIG. 3, the controlled atmosphere system 370 preferably comprises a chamber 385 into which conditioning fluid is introduced from a reservoir 375 through a conduit 380. The conditioning fluid preferably comprises argon. However, other inert, relatively heavy gases are equally preferred. Furthermore, the preferable mechanism of providing the conditioning fluid into the quench chamber 345 is the formation of a pressure differential between the quench chamber 345 and the outlet 365. Such pressure differential will draw the conditioning fluid into the quench chamber 345 through the ports 390. Other less preferred methods of providing the conditioning fluid include, but are not limited to, forming positive pressure within the chamber 385.

The frusto-conical shape of the quench chamber 345 can provide a modest amount of turbulence within the quench region, thereby promoting the mixing of the conditioning fluid with the reactive mixture, and increasing the quenching rate beyond prior art systems. However, in some situations, an even greater increase in quenching rate may be desired. Such an increase in quenching rate can be achieved by creating a highly turbulent flow within a region of a quench chamber where the conditioning fluid is mixed with the reactive mixture.

Figure 4:
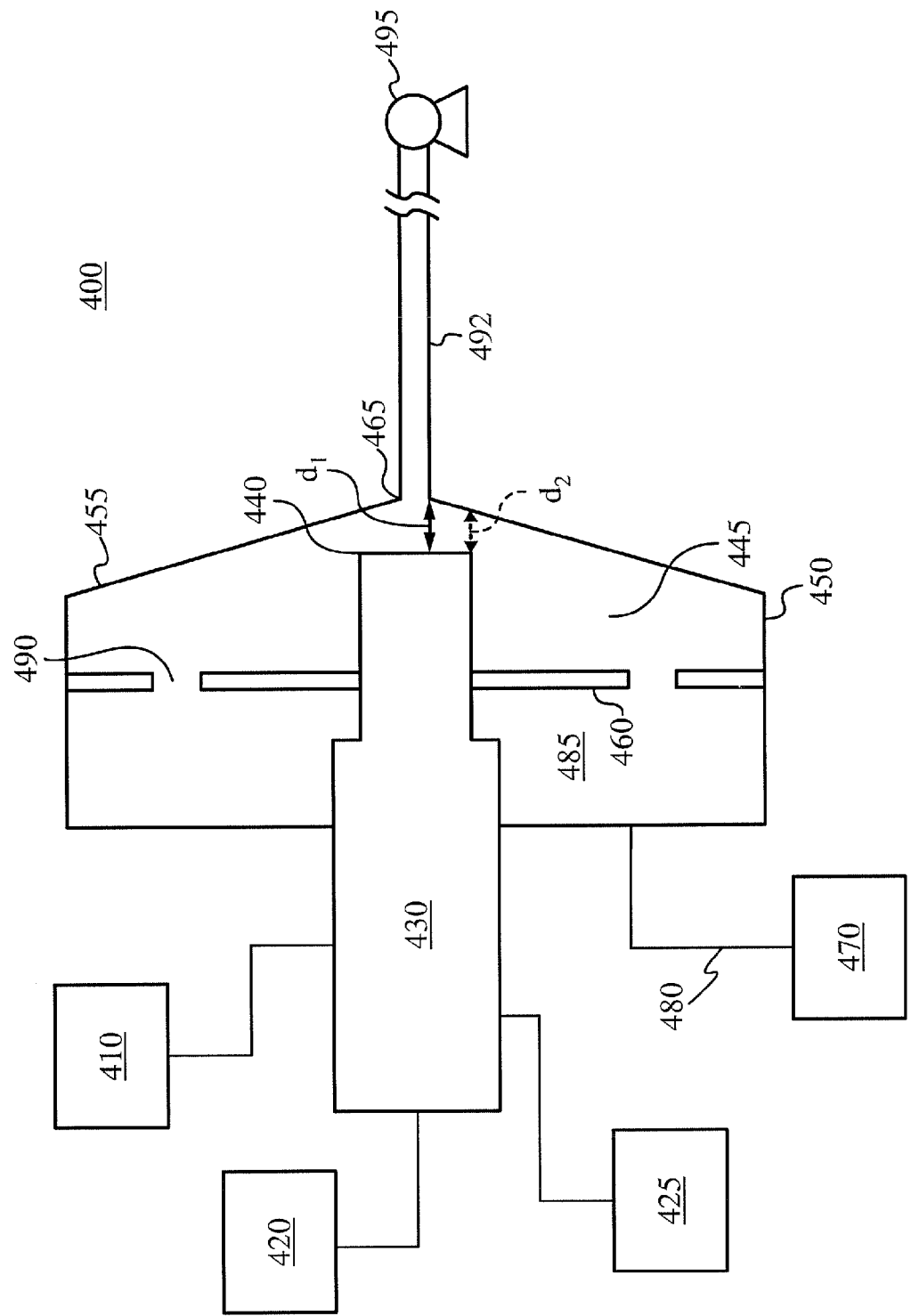
FIG. 4 illustrates another embodiment of a particle production system in accordance with the principles of the present invention.

FIG. 4 illustrates a particle production system 400 with a highly turbulent quench chamber 445. The system 400 comprises a precursor supply device 410 a working gas supply device 420 fluidly coupled to a plasma production and reaction chamber 430, similar to plasma production chamber 330 discussed above with reference to FIG. 3. An energy delivery system 425 is also coupled with the plasma production and reactor chamber 430. The plasma production and reactor chamber 430 includes an injection port 440 that communicates fluidly with the constricting quench chamber 445. One or more ports 490 can also allow fluid communication between the quench chamber 445 and a controlled atmosphere system 470, similar to controlled atmosphere system 370 in FIG. 3. The quench chamber 445 is also fluidly coupled to an outlet 465.

Generally, the chamber 430 operates as a reactor, similar to chamber 330 in FIG. 3, producing an output comprising particles within a gas stream. Production includes the basic steps of combination, reaction, and conditioning as described later herein. The system combines precursor material supplied from the precursor supply device 410 and working gas supplied from the working gas supply device 420 within the energy delivery zone of the chamber 430. The system energizes the working gas in the chamber 430 using energy from the energy supply system 490, thereby forming a plasma. The plasma is applied to the precursor material within the chamber 430 to form an energized, reactive mixture. This mixture comprises one or more materials in at least one of a plurality of phases, which may include vapor, gas, and plasma. The reactive mixture flows from the plasma production and reactor chamber 430 into the quench chamber 445 through an injection port 440.

The quench chamber 445 preferably comprises a substantially cylindrical surface 450, a frusto-conical surface 455, and an annular surface 460 connecting the injection port 440 with the cylindrical surface 450. The frusto-conical surface 460 narrows to meet the outlet 465. The plasma production and reactor chamber 430 includes an extended portion at the end of which the injection port 440 is disposed. This extended portion shortens the distance between the injection port 440 and the outlet 465, reducing the volume of region in which the reactive mixture and the conditioning fluid will mix, referred to as the quench region. In a preferred embodiment, the injection port 440 is arranged coaxially with the outlet 465. The center of the injection port is positioned a first distance $d_1$ from the outlet 465. The perimeter of the injection port is positioned a second distance $d_2$ from a portion of the frusto-conical surface 455. The injection port 440 and the frusto-conical surface 455 form the aforementioned quench region therebetween. The space between the perimeter of the injection port 440 and the frusto-conical surface 455 forms a gap therebetween that acts as a channel for supplying conditioning fluid into the quench region. The frusto-conical surface 455 acts as a funneling surface, channeling fluid through the gap and into the quench region.

While the reactive mixture flows into the quench chamber 445, the ports 490 supply conditioning fluid into the quench chamber 445. The conditioning fluid then moves along the frusto-conical surface 455, through the gap between the injection port 440 and the frusto-conical surface 455, and into the quench region. In some embodiments, the controlled atmosphere system 470 is configured to control the volume flow rate or mass flow rate of the conditioning fluid supplied to the quench region.

As the reactive mixture moves out of the injection port 440, it expands and mixes with the conditioning fluid. Preferably, the angle at which the conditioning fluid is supplied produces a high degree of turbulence and promotes mixing with the reactive mixture. This turbulence can depend on many parameters. In a preferred embodiment, one or more of these parameters is adjustable to control the level of turbulence. These factors include the flow rates of the conditioning fluid, the temperature of the frusto-conical surface 455, the angle of the frusto-conical surface 455 (which affects the angle at which the conditioning fluid is supplied into the quench region), and the size of the quench region. For example, the relative positioning of the frusto-conical surface 455 and the injection port 440 is adjustable, which can be used to adjust the volume of quench region. These adjustments can be made in a variety of different ways, using a variety of different mechanisms, including, but not limited to, automated means and manual means.

During a brief period immediately after entering the quench chamber 445, particle formation occurs. The degree to which the particles agglomerate depends on the rate of cooling. The cooling rate depends on the turbulence of the flow within the quench region. Preferably, the system is adjusted to form a highly turbulent flow, and to form very dispersed particles. For example, in preferred embodiments, the turbidity of the flow within the quench region is such that the flow has a Reynolds Number of at least 1000.

Still referring to FIG. 4, the structure of the quench chamber 445 is preferably formed of relatively thin walled components capable of dissipating substantial quantities of heat. For example, the thin-walled components can conduct heat from inside the chamber and radiate the heat to the ambient.

Substantial heat is emitted, mostly in the form of radiation, from the reactive mixture following its entry into the quench chamber 445. The quench chamber 445 is designed to dissipate this heat efficiently. The surfaces of the quench chamber 245 are preferably exposed to a cooling system (not shown).

In a preferred embodiment, the cooling system is configured to control a temperature of the frusto-conical surface 455.

Following injection into the quench region, cooling, and particle formation, the mixture flows from the quench chamber 445 through the outlet port 465. Suction generated by a generator 495 moves the mixture and conditioning fluid from the quench region into the conduit 492. From the outlet port 465, the mixture flows along the conduit 492, toward the suction generator 495. Preferably, the particles are removed from the mixture by a collection or sampling system (not shown) prior to encountering the suction generator 495.

Still referring to FIG. 4, the controlled atmosphere system 470 comprises a chamber 485, fluidly coupled to the quench region through port(s) 490, into which conditioning fluid is introduced from a reservoir, such as reservoir 375 from FIG. 3, through a conduit 480. As described above, the conditioning fluid preferably comprises argon. However, other inert, relatively heavy gases are equally preferred. Also, as discussed above, the preferable mechanism of providing the conditioning fluid into the quench chamber 445 is the formation of a pressure differential between the quench chamber 445 and the outlet 465. Such pressure differential will draw the conditioning fluid into the quench chamber 445 through the ports 490. Other methods of providing the conditioning fluid include, but are not limited to, forming positive pressure within the chamber 485.

The angle of the frusto-conical surface affects the angle at which the conditioning fluid is supplied into the quench region, which can affect the level of turbulence in the quench region. The conditioning fluid preferably flows into the quench region along a plurality of momentum vectors. The greater the degree of the angle between the momentum vectors, the higher the level of turbulence that will be produced. In a preferred embodiment, the high turbulent quench chamber comprises a frusto-conical surface that is configured to funnel at least two conditioning fluid momentum vectors into the quench region such that there is at least a 90 degree angle between the two momentum vectors. It is contemplated that other angle degree thresholds may be applied as well. For example, attention may also be paid to the angle formed between at least one of the conditioning fluid momentum vectors and the momentum vector of the reactive mixture. In one embodiment of a highly turbulent quench chamber, a reactive mixture inlet is configured to supply the reactive mixture into the quench region along a first momentum vector, the frusto-conical surface is configured to supply the conditioning fluid to the quench region along a second momentum vector, and the second momentum vector has an oblique angle greater than 20 degrees relative to the first momentum vector.

The size of the quench region also affects the level of turbulence in the quench region. The smaller the quench region, the higher the level of turbulence that will be produced. The size of the quench region can be reduced by reducing the distance between the center of the injection port 440 and the outlet 465.

The high turbulence produced by the embodiments of the present invention decreases the period during which particles formed can agglomerate with one another, thereby producing particles of more uniform size, and in some instances, producing smaller-sized particles. Both of these features lead to particles with increased dispersibility and increased ratio of surface area to volume.

Referring back to the method 100 in FIG. 1, particle production system 300 or 400 (or variations thereof) can be used to provide the plurality of particles in nano-scale form. For example, these particles can be introduced as micron-sized precursor material into the particle production system, where they are vaporized and then condensed to form nano-size particles. In some embodiments, the different types of particles (e.g., ceramic and metallic) are formed and provided separately from one another, thereby avoiding any premature interaction (e.g., bonding) between them. Such separation can be achieved in a variety of ways, including, but not limited to, using different particle production systems for both groups, or by using the same particle production system for both groups at different times. However, in some embodiments, different types of particles are nanosized together, using the same particle production system at the same time.

At step 120, a tile is formed from the plurality of particles. It is contemplated that this formation can be achieved in a variety of ways. In some embodiments, the tile is formed by performing a sintering process on the plurality of particles. When using nano-particles to form the tile, maintaining the nano-scale properties of the particles during formation may be difficult. For example, performing a standard sintering process on a plurality of nano-particles will typically result in an undesirable amount of melting of the nano-particles due to the high-temperature of the standard sintering process, thereby leading to nano-particles uniting with nearby nano-particles to a degree that they form particles that are larger than nano-particles. Therefore, in order to maintain the nano-scale properties of the particles within the formed tile, some embodiments employ spark plasma sintering (also known as field assisted sintering technique) on the plurality of particles to form the tile. Spark plasma sintering uses axial pressure and elevated temperature that are generated by a current flow. The energy released by the current raises the temperature in the graphite dies enclosing the powder and within powders that have some electrical conductivity. The heat is generated internally, in contrast to conventional hot pressing, where the heat is provided by external heating elements. The spark plasma sintering process is very fast, thereby ensuring it has the potential of densifying powders with nanosize or nano-structure, while avoiding coarsening which accompanies standard densification routes. Spark plasma sintering provides significant advantages by lowering the required sintering temperature and shortening its duration.

At step 130, the tile is bonded to a ductile backing material using heat-curable adhering material and catalyzed foamable exothermic material between the tile and the ductile backing material. Such a bonding process is described in U.S. Pat. No. 6,117,376 to Merkel, entitled "Method of Making Foam-Filled Composite Products," the entirety of which is hereby incorporated by reference as if set forth herein. Merkel discloses a method for making foam-filled parts having fiber-reinforced skins or surfaces. Mold halves of pressure-resisting thermally insulative material are covered with a release material, which is then covered with the fiber skins. The fiber skins are coated with heat-curable resin, and the mold halves are then clamped together to form a cavity. A catalyzed foam-forming mixture is poured into the cavity. The mixture foams and expands to the full volume of the cavity. While the mixture hardens, it generates heat sufficient to cure the resin.

In some embodiments, the concave inner surfaces of the mold halves are covered with a commercial Teflon™ sheet having an adhesive backing. This material adheres to the mold face through numerous replications of parts and freely releases from polymers that are cured in direct contact with its surface. This approach also has the advantage of avoiding contamination of the resin surface with the release agent, such as wax-based materials. Dry (i.e., unimpregnated) fiber-reinforced skin material is laid in to cover the inner surfaces of the mold halves. The fiber skins can be in loosely woven sheet or strip form, having sufficient cross weave fibers to permit easy handling without separating. The fibers are then thoroughly wetted or impregnated in place with an uncured resin, such as an epoxy resin from West, sold as system resin with 205 or 206 hardener. The hardener is a thermally activated catalyst that requires a long term curing at ambient temperature, although it acts quickly above a threshold, so that it remains wet until the proper time in the ensuing process. The resin system causes the fiber reinforcement to adhere tightly to the inner surfaces of the mold halves, despite the Teflon™ covering. With the two mold halves prepared in this manner, they can be placed together. With side flanges being in intimate contact, an interior cavity is defined between the concave inner surfaces of the mold halves, and C-clamps are then placed about the periphery of the flanges and tightened. The clamped mold halves thus form what may be regarded as a pressure vessel. In addition, a malleable seal is placed across one end of the mold cavity.

When the two mold halves are clamped together in opposition, the C-clamps are tightened sufficiently on the flanges to prevent leakage of foam material out the sides. The mold cavity is thus sealed on three sides, and can be placed in a substantially vertical position so that a premixed foamable liquid can be poured in immediately after preparation. This mix may be of the type such as Polytech 20/08-, and will include the proper amount of catalyst for the volume of resin and the cavity. This material expands to about 40 times its original volume. The foamable liquid mix rapidly begins to expand and build up interior pressure within the mold cavity after being poured. The reaction is strongly exothermic, and heats the foam to in excess of 300 degrees F. as it expands under significant local pressure everywhere in the mold cavity. The heat is conducted into the skin layers throughout. A property of this mixture, however, is that the expansion is self-limiting, in that while significant pressure is generated during expansion, total expansion is limited by the rapid hardening characteristic of the material. Consequently, while the predetermined volume of mix is such that material foams out of the top of the mold cavity, and may even leak through the malleable seal to a limited extent, the interior of the mold cavity is uniformly pressurized and there are no voids. The heat generated by the exotherm raises the temperature of the wet resin matrix at the skin above the curing level. A high temperature level is also maintained for many more minutes by the insulative characteristic of the mold halves. The close physical, pressurized contact between the foam and the skin resin system not only cures the skins into true fiber-reinforced composites, but assures chemical adherence at the interface between the foam and the skin on all surfaces. Typically, after one to two hours, the C-clamps are released and the mold halves are readily separated from the formed composite.

While any of the features of U.S. Pat. No. 6,117,376 to Merkel can be used in the bonding process of the present invention, it is contemplated that certain modifications can be made in order to bond an inorganic tile to a ductile backing material, which is not disclosed in Merkel. For example, in some embodiments, fiber skins may be required on only one of the mold halves or on one side of the composite (e.g., acting as the ductile backing material). Additionally, in some embodiments, the resin (or other heat curable adhering material) may be required on only one of the mold halves or on one side of the composite. Furthermore, in some embodiments, separable mold halves may not be required. In some embodiments, all that is required is that an interior volume between the tile and the ductile backing material be sealed to a degree sufficient to allow the catalyzed foamable exothermic material to expand and build up interior pressure within the interior volume, thereby creating physical pressurized contact between the catalyzed foamable exothermic material and the heat-curable adhering material of each of the tile and the ductile backing material. Other modifications are within the scope of the present invention as well.

Figures 2A, 2B:
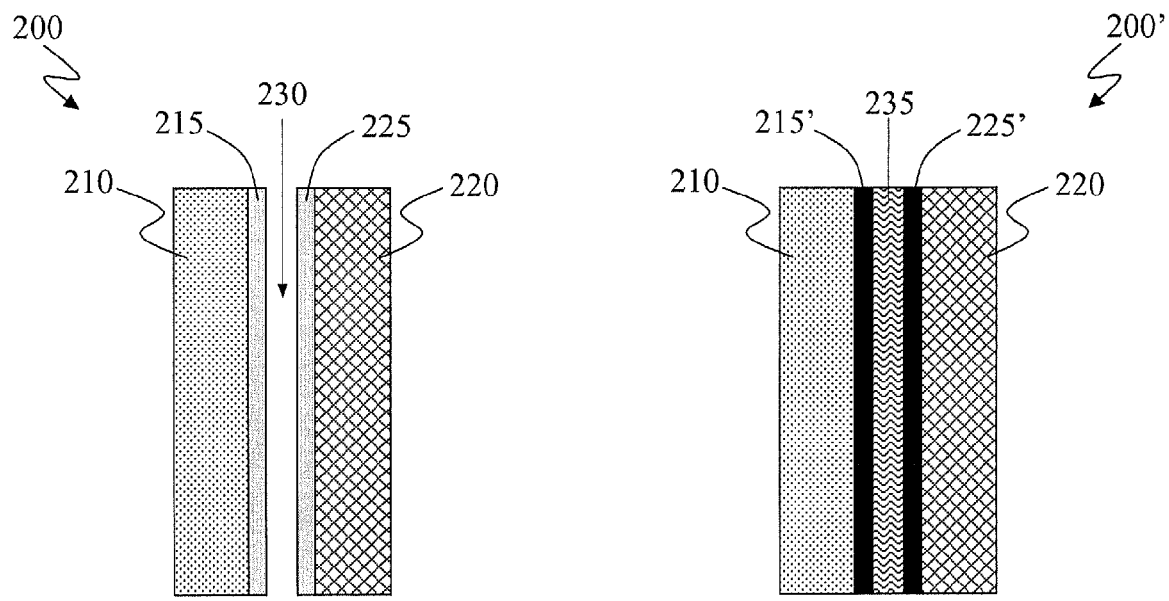
FIG. 2A illustrates one embodiment of a tile and a ductile backing material before insertion of catalyzed foamable exothermic material within the interior volume between them.
FIG. 2B illustrates one embodiment of a tile and a ductile backing material after insertion of catalyzed foamable exothermic material within the interior volume between them in accordance with the principles of the present invention.

FIG. 2A illustrates one embodiment 200 of a tile 210 and a ductile backing material 220 before insertion of catalyzed foamable exothermic material within the interior volume 230 between them. The tile 210 is formed from particles, preferably nano-particles. In some embodiments, the particles include ceramic particles, including, but not limited to boron carbide. In some embodiments, the particles also include metallic particles, including, but not limited to, copper, tantalum, titanium, molybdenum, and aluminum. In some embodiments, the ductile backing material 220 is formed from organic material. In some embodiments, the ductile backing material 220 is formed from a plurality of fibers. In some embodiments, the ductile backing material 220 is formed from a plurality of polyethylene fibers. In some embodiments, the ductile backing material 220 is Dyneema® or Kevlar®.

The interior surface of the tile 210 is wetted with a heat-curable adhering material 215. The interior surface of the ductile backing material 220 is also wetted with a heat-curable adhering material 225. In some embodiments, heat-curable adhering material 215 and heat-curable adhering material 225 are the same material. In some embodiments, the adhering material is resin.

An interior volume 230 is formed between the tile 210 and the ductile backing material 220, with the interior surface of the tile 210 and the interior surface of the ductile backing material 220 facing one another. The interior surface of the tile 210 and the interior surface of the ductile backing material 220 each form a boundary of the interior volume 230. The tile 210 and the ductile backing material 220 can be secured in this position using mold halves and/or clamps, and/or other securing and sealing means. For the purposes of this disclosure, the interior volume 230 does not extend into any area that is not disposed between the tile 210 and the ductile backing material 220.

A catalyzed foamable exothermic material, such as that used in U.S. Pat. No. 6,117,376 to Merkel, is inserted into the interior volume after wetting the interior surfaces of the tile 210 and the ductile backing material 220 with the heat-curable adhering material. An amount of catalyzed foamable exothermic material is used that is sufficient to fill (in some cases, overfill) the entire interior volume when foamed and form a solid foam body between the tile 210 and the ductile backing material 220. The exotherm from the foaming is allowed to activate and cure the heat-curable adhering material 215, 225 for a time sufficient to unite the solid foam body to the heat-curable adhering material 215, 225 of the tile 210 and the ductile backing material 220.

FIG. 2B illustrates one embodiment 200' of the tile 210 and the ductile backing material 220 after insertion of catalyzed foamable exothermic material within the interior volume between them in accordance with the principles of the present invention. The catalyzed foamable exothermic material has expanded to form a solid foam body 235 that fills the entire interior volume 230. The heat-curable adhering material 215 and 225 has been cured by the exotherm from the foaming to form cured adhering material 215' and 225'.

The use of the catalyzed foamable exothermic material and heat-curable adhering material provides a significant advantage over the use of an autoclave, which is the standard way of bonding a meltable plate to a hard plate. An autoclave process is too hot, resulting in the loss of the nanoscale properties of the tile 210. Typically, the maximum temperature of the bonding process is half the melting point temperature of the particles of the tile 210. However, when the tile 210 is formed from nano-particles, the maximum temperature of the bonding process is preferably one-quarter of the melting point temperature of the particles of the tile 210. Using the exotherm from the foamable material instead of the heat from an autoclave allows the temperature of the bonding process to be sufficiently minimized and the tile 210 to retain its nano-properties.

It is noted that while FIGS. 2A-B show certain shapes and sizes of the components, other shapes and sizes (as well as other configurations) are also within the scope of the present invention. For example, the tile 210, ductile backing material 220, and the interior volume 230 are shown as having substantially rectangular features. However, it is contemplated that these components can be shaped in other ways, such as with curves. Additionally, although the tile 210 and the ductile backing material 220 are shown having substantially the same thickness, it is contemplated that one can be substantially thicker than the other. Furthermore, the heat-curable adhering material 225 may extend into the ductile backing material 220. For example, in an embodiment where the ductile backing material 220 comprises fibers, the fibers may be held together and/or in position by the heat-curable adhering material.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of making a composite material, the method comprising:
   providing a tile, wherein the tile comprises an inorganic material; and
   bonding the tile to a ductile backing material using heat-curable adhering material and catalyzed foamable exothermic material between the tile and the ductile backing material, wherein heat generated from the use of the catalyzed foamable exothermic material cures the heat-curable adhering material;
   wherein the step of bonding comprises:
   wetting an interior surface of the tile with the heat-curable adhering material;
   wetting an interior surface of the ductile backing material with the heat-curable adhering material;
   forming an interior volume between the tile and the ductile backing material, wherein the interior surface of the tile and the interior surface of the ductile backing material are facing one another, and wherein the interior surface of the tile and the interior surface of the ductile backing material each form a boundary of the interior volume;
   inserting the catalyzed foamable exothermic material into the interior volume after wetting the interior surfaces of the tile and the ductile backing material with the heat-curable adhering material, wherein an amount of catalyzed foamable exothermic material is used that is sufficient to fill the entire interior volume when foamed and form a solid foam body between the tile and the ductile backing material; and allowing the exotherm from the foaming to activate and cure the heat-curable adhering material for a time sufficient to unite the solid foam body to the heat-curable adhering material of the tile and the ductile backing material.

2. The method of claim 1, wherein the step of forming the interior volume comprises sealing the interior volume to a degree sufficient to allow the catalyzed foamable exothermic material to expand and build up interior pressure within the interior volume, thereby creating physical pressurized contact between the catalyzed foamable exothermic material and the heat-curable adhering material of each of the tile and the ductile backing material.

3. A method of making a composite material, the method comprising:
- providing a plurality of nano-particles;
- forming a tile from the plurality of nano-particles by performing a spark plasma sintering process on the plurality of nano-particles; and
- bonding the tile to a ductile backing material using heat-curable adhering material and catalyzed foamable exothermic material between the tile and the ductile backing material, wherein heat generated from the use of the catalyzed foamable exothermic material cures the heat-curable adhering material;
- wherein the step of bonding comprises:
- wetting an interior surface of the tile with the heat-curable adhering material;
- wetting an interior surface of the ductile backing material with the heat-curable adhering material;
- forming an interior volume between the tile and the ductile backing material, wherein the interior surface of the tile and the interior surface of the ductile backing material are facing one another, and wherein the interior surface of the tile and the interior surface of the ductile backing material each form a boundary of the interior volume;
- inserting the catalyzed foamable exothermic material into the interior volume after wetting the interior surfaces of the tile and the ductile backing material with the heat-curable adhering material, wherein an amount of catalyzed foamable exothermic material is used that is sufficient to fill the entire interior volume when foamed and form a solid foam body between the tile and the ductile backing material; and
- allowing the exotherm from the foaming to activate and cure the heat-curable adhering material for a time sufficient to unite the solid foam body to the heat-curable adhering material of the tile and the ductile backing material.

4. The method of claim 3, wherein the step of forming the interior volume comprises sealing the interior volume to a degree sufficient to allow the catalyzed foamable exothermic material to expand and build up interior pressure within the interior volume, thereby creating physical pressurized contact between the catalyzed foamable exothermic material and the heat-curable adhering material of each of the tile and the ductile backing material.

* * * * *